United States Patent [19]

Nisigahana et al.

[11] 4,307,129
[45] Dec. 22, 1981

[54] METHOD OF ENCASING ELECTRIC COMPONENTS

[75] Inventors: Masaharu Nisigahana, Fukui; Haruo Hori, Sabae, both of Japan

[73] Assignee: Murata Manufacturing Co., Ltd., Japan

[21] Appl. No.: 143,041

[22] Filed: Apr. 23, 1980

[30] Foreign Application Priority Data

Jan. 5, 1979 [JP] Japan ............................... 54-54514

[51] Int. Cl.³ .................................. B05D 5/12
[52] U.S. Cl. ............................... 427/58; 427/79;
427/80; 427/102; 427/103; 427/270; 427/271;
427/273; 427/284; 427/336; 427/409; 427/410;
427/430.1; 427/435; 427/259; 427/384
[58] Field of Search ............... 174/52 PE; 427/79, 80,
427/284, 273, 271, 270, 336, 409, 410, 435,
430.1, 102, 103, 58, 259, 384

[56] References Cited

U.S. PATENT DOCUMENTS

| | | | |
|---|---|---|---|
| 2,452,879 | 11/1948 | Tompkins et al. | 427/284 |
| 3,055,777 | 9/1962 | Grad | 427/102 |
| 3,967,000 | 6/1976 | Klein et al. | 427/80 |
| 4,127,680 | 11/1978 | Shirn et al. | 427/80 |

Primary Examiner—John D. Smith
Assistant Examiner—Richard Bueker
Attorney, Agent, or Firm—Ostrolenk, Faber, Gerb & Soffen

[57] ABSTRACT

A method for encasing an electric component of a type comprising a body and at least one pair of lead wires extending outwardly therefrom in the same direction. An outer protective coating or casing enclosing the body therein is formed by dipping the electric component into a solution of chlorinated hydrocarbon containing either a chained aliphatic hydrocarbon or a higher fatty acid to form a film covering the entire surface of the body and the surfaces of portions of the lead wires adjacent the body, then dipping the electric component into a solvent to remove the film except for that covering the surface of a portion of the body adjacent the lead wires and also that covering the surfaces of that portions of the lead wires, and finally dipping the electric component into a coating solution.

8 Claims, 7 Drawing Figures

METHOD OF ENCASING ELECTRIC COMPONENTS

BACKGROUND OF THE INVENTION

The present invention generally relates to a method of encasing electric components and, more particularly, to a method for the formation of an outer protective coating in an electric component, such as a ceramic capacitor or the like, of a type having at least one pair of lead wires extending outwardly from the body of the electric component in the same direction for external electric connection.

Electric components of the type referred to above are largely employed in electric and/or electronic equipments and are generally mounted on printed circuit boards with their lead wires soldered to printed circuit wirings. One example of the electric components, for example, a ceramic capacitor, is illustrated in FIG. 1 of the accompanying drawings, with a portion broken away, in the form as mounted on a printed circuit board. Referring to FIG. 1, the prior art ceramic capacitor 8 comprises a generally disc-shaped component body 4 including a sintered dielectric plate 1 of any known dielectric material, for example, barium titanate, and a pair of electrode discs 2 and 3 attached respectively to the opposed surfaces of the dielectric plate 1, lead wires 5 and 6 equal in number to the number of the electrode discs 2 and 3, each of said lead wires 5 and 6 having one end soldered to the corresponding electrode disc 2 or 3, and an outer protective coating or casing 7.

According to the prior art, the outer protective coating 7 is formed by dipping the component body 4 into a coating solution, then drying the component body 4 after the latter has been withdrawn out of the coating solution, and finally baking the dried component body 4 to allow the layer of the coating solution to be hardened or cured.

However, the prior art encasing method involves a disadvantage. Specifically, since the protective coating 7 must cover the entire surface of the component body 4, the component body 4 is completely immersed into the coating solution in its entirety during the dipping process. The complete immersion of the component body 4 into the coating solution results in unnecessary coating of the coating solution to respective portions of the lead wires 5 and 6 adjacent to the component body 4, involving waste of the coating solution. In addition, where the drying is effected while the coated component body 4 is supported in a manner with the lead wires 5 and 6 oriented downwards, the coating solution applied not only to the component body 4 but also to that portions of the lead wires 5 and 6 adjacent the component body 4 tends to flow downwards along the lead wires 5 and 6, which solution, when dried, forms generally downwardly tapering buldges, such as shown by 9 and 10, at the respective portions of the lead wires 6 and 5 adjacent the component body 4.

In general, the buldges of the coating material so formed according to the prior art encasing method often run about 3 to 5 millimeters. Therefore, unless the buldges of the coating material are minimized or substantially eliminated, the height of the ceramic capacitor 8 relative to the printed circuit board 11 tends to become large when it is mounted on the printed circuit board 11 with the lead wires 5 and 6 soldered to the printed circuit wirings. This is because the buldges 9 and 10 themselves serve as undesirable spacer spacing the component body 4 a distance away from the printed circuit board. As is well known to those skilled in the art, the larger the space between the component body 4 and the printed circuit board 11, the more bulky the electric or electronic equipments tends to become.

In addition, in view of the fact that the buldges of the coating material in one given ceramic capacitor tend to have different lengths, difficulties are often involved in mounting the ceramic capacitor precisely on the printed circuit board.

Attempts to minimize the buldges of the coating material such as shown by 9 and 10, have not been successful because of the limitations imposed by (1) the diameter and the thickness of the dielectric plate 1, (2) the fitting angles of the lead wires 5 and 6 relative to the corresponding electrode discs 2 and 3, (3) the wettability and the viscosity of the coating solution and the depth of immersion of the component body, and (4) the skill of attendant workers.

SUMMARY OF THE INVENTION

Accordingly, the present invention has been developed in view to substantially eliminating the above described disadvantages and inconveniences inherent in the prior art encasing method and is intended to provide an improved method effective to minimize the formation of the buldges, thereby avoiding any possible waste of coating solution.

Another important object of the present invention is to provide an improved method effective to provide uniformly encased electric components in an economical manner.

According to the present invention, an essential feature resides in that the body of the electric component is, prior to being dipped into the coating solution, dipped into a solution of chlorinated hydrocarbon containing either a straight-chained aliphatic hydrocarbon or a higher fatty, aliphatic acid dissolved therein. The dipping of the electric component into the chlorinated hydrocarbon solution is carried out to such an extent that portions of the lead wires adjacent the body of the electric component are, while the body of the electric component is completely immersed into the solution, wetted with the solution to form respective films of chlorinated hydrocarbon.

Because of the presence of the films so formed as hereinbefore described, the coating solution tending to adhere to those portions of the lead wires adjacent the body of the electric component during the dipping of the electric component into the coating solution can advantageously be shed or repelled. Accordingly, any possible formation of the undesirable buldges of the coating material at that portions of the lead wires adjacent the body of the electric component can advantageously minimized or substantially eliminated.

BRIEF DESCRIPTION OF THE DRAWINGS

These and other objects and features of the present invention will become apparent from the following description taken in conjunction with a preferred embodiments thereof with reference to the accompanying drawings, in which.

DETAILED DESCRIPTION OF THE INVENTION

Figure 1:
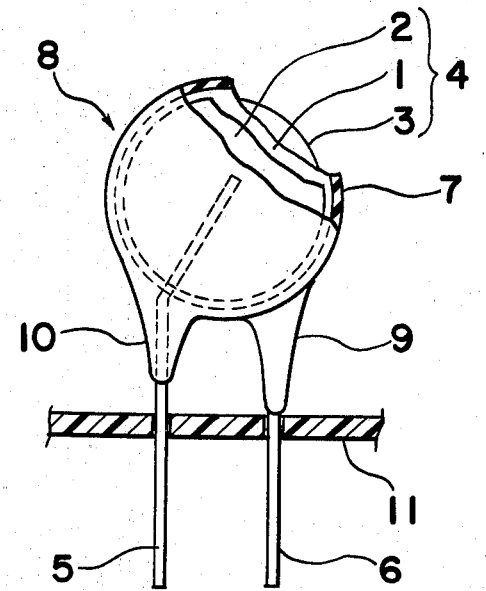
FIG. 1 is a front elevational view, with a portion broken away, of the prior art ceramic capacitor in the form as mounted on the printed circuit board.

Before the description of the present invention proceeds, it is to be noted that like parts are designated by like reference numerals throughout the accompanying drawings. It is also to be noted that, although the method of the present invention is applicable not only to the disc-shaped capacitor having its lead wires extending radially outwardly therefrom in the same direction, but also any other electric component of any desired shape, such as a generally cylindrical resistor or a ceramic resonator or the like, so far as the electric component has at least one pair of lead wires extending outwardly therefrom in the same direction substantially in parallel relation to each other, the present invention will be described as applied to the disc-shaped ceramic capacitor for the sake of brevity.

Figure 2A:
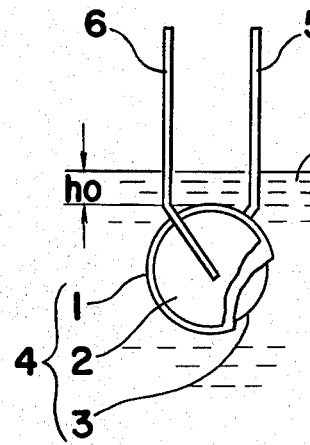
FIG. 2 to FIG. 6 illustrate the sequence of an electric component encasing method according to the present invention.

Referring particularly to FIGS. 2 to 6, the component body 4 of the construction described with reference to FIG. 1 and having the lead wires 5 and 6 is, prior to being dipped into the coating solution as will be described below, dipped into a solution 12 of chlorinated hydrocarbon, such as trichloroethylene or trichloroethane, containing therein either one of a straight-chained aliphatic hydrocarbon, for example, paraffine, and a higher fatty acid, for example, wax or stearin, in an amount within the range of 1 to 5% by weight relative to the total weight of the solution. The dipping of the component body 4 into the solution 12 is carried out in a manner as shown in FIG. 2 with the lead wires 5 and 6 oriented upwards and outwardly of the surface level of the solution 12 contained in a bath (not shown). The depth ho through which the component body 4 is immersed into the solution 12, which depth is determined in terms of a minimum possible distance between the surface level of the solution 12 within the bath and the periphery of the component body 4, is preferably within the range of 3 to 5 millimeters. By so doing, a film of the solute, that is, either the straight-chained aliphatic hydrocarbon or the higher fatty acid, can be formed in a thickness of approximately 2 micron, convering not only the entire surface of the component body 4, but also portions of the lead wires 5 and 6 adjacent the component body 4.

Figure 3:
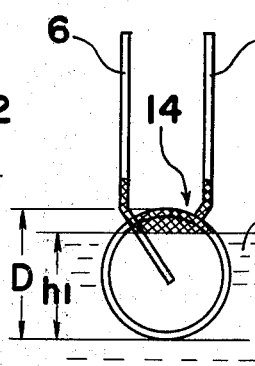
Figure 4:
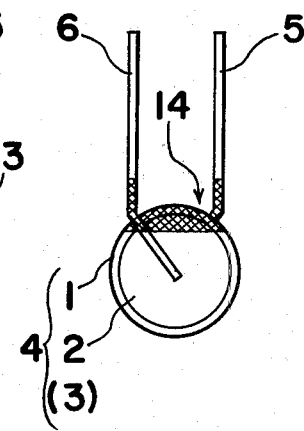

Subsequent to the dipping of the component body 4 into the solution 4 to form the film of the solute, only a portion of the film of the solute covering the component body 4 is removed by dipping the component body 4 into a solvent 13 containing either one of trichloroethane and trichloroethylene effective to dissolve the film of straight-chained aliphatic hydrocarbon or the higher fatty acid. This dipping process is carried in a manner substantially similar to the dipping into the solution 12, however, the depth $h_1$ through which the component body 4 is immersed into the solvent 13 being preferably within the range of two-thirds to four-fifths of the diameter D of the component body 4, as shown in FIG. 3. This means that the component body 4 is partially immersed into the solvent 13 to allow a portion of the film adhering to that portion of the component body 4 completely immersed into the solvent 13 to be removed, leaving the film adhering to the remaining portion of the component body 4 and also the lead wires 5 and 6 unremoved as shown by a cross-hatched area 14 in FIG. 4.

Figure 5:
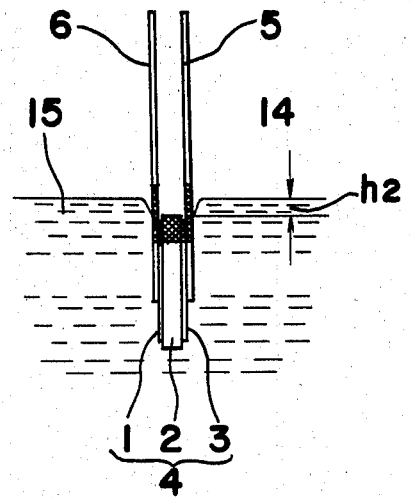

The component body 4 having the film adhering to that area 14 thereof is thereafter heat-treated for two minutes at 80° to 100° C., or allowed to stand, to evaporate the residue of the solvent and is then dipped into a coating solution 15 in a manner as shown in FIG. 5. The coating solution 15 is of a type containing one of synthetic resins such as phenol, xylene and epoxy having a property of being repelled in contact with the film of straight-chained aliphatic hydrocarbon or higher fatty acid. The dipping of the component body 4 into the coating solution 15 is carried out by immersing the component body 4 a predetermined depth $h_2$ below the surface level of the coating solution, said depth $h_2$ being substantially equal to or smaller than the depth ho shown in FIG. 2. However, the depth $h_2$ through which the component body 4 is immersed into the coating solution 15 with the lead wires 5 and 6 oriented upwardly out of the surface level of the solution 15 varies depending upon the wettability and the viscosity of the coating solution 15, and the concentration of the solute in the film, in such a manner as shown in the following table.

TABLE

| Type of Coating Material | Film Viscosity (cps) | Type of Film | Solute Concentration in Solution (%) | Depth $h_2$ (mm) |
|---|---|---|---|---|
| Phenolic Resin | 1,080 | Paraffine | 1 | 1.0 |
| " | 1,080 | " | 3 | 2.0 |
| " | 1,080 | " | 5 | 3.0 |
| " | 4,300 | " | 1 | 1.0 |
| " | 4,300 | " | 3 | 2.0 |
| " | 4,300 | " | 5 | 2.5 |
| " | 7,100 | " | 1 | 1.0, 2.0 |
| " | 7,100 | " | 3 | 1.0 |
| " | 7,100 | " | 5 | 2.0 |
| " | 4,300 | Microcrystalline Wax | 3 | 2.0 |
| Xylene Resin | 4,500 | Paraffine | 3 | 2.5 |
| " | 4,500 | Microcrystalline Wax | 3 | 2.0 |
| Epoxy Resin | 4,200 | Paraffine | 3 | 1.0 |
| " | 4,200 | Microcrystalline Wax | 3 | 0.8 |

Note that the solvent used in preparing the solution 12 for the film was trichloroethylene.

Figure 6:
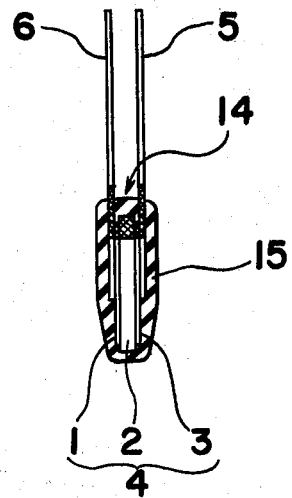
Figure 7:
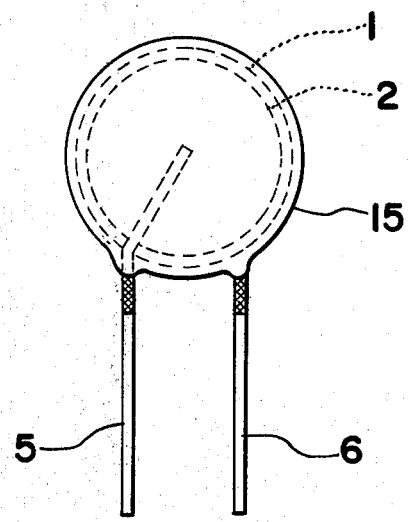
FIG. 7 is a front elevational view of the ceramic capacitor encased by the method of the present invention.

From the table above, it will readily be seen that, where the depth $h_2$ is selected to be within the range of 1 to 3 mm., the tendency of the coating solution 15 to adhere to the component body 4 overcomes the tendency of the film to repel the applied coating solution and, therefore, the coating solution once applied to the component body 4 flows over a peripheral portion of the component body 4 between the lead wires 5 and 6, thereby completely encircling the component body 4 in a manner substantially as shown in FIG. 6, without substantially adhering to that portions of the lead wires 5 and 6 adjacent the component body 4. After the component body 4 immersed into the coating solution 15 in the manner as hereinbefore described has been withdrawn out of the coating solution 15 and dried, the component body 4 is covered by an outer protective coating 15 completely enclosing the component body 4 therein as shown in FIG. 6.

It is to be noted that, in order to allow the coating solution to flow over the peripheral portion of the component body 4 between the lead wires 5 and 6 so as to cover the component body 4 entirely without being repelled by the presence of the film, the withdrawal of the component body 4 so immersed into the coating solution 15 should be carried out slowly and, preferably, at a rate of 2 mm/sec.

From the foregoing description, it has now become clear that, because of the presence of the unremoved film at the portions of the lead wires 5 and 6 adjacent the component body 4, the complete ceramic capacitor is free from any bulge of the coating material such as present in the prior art ceramic capacitor. However, it is to be noted that, since the film so formed at those portions of the lead wires 5 and 6 adjacent the component body 4 is burned during the drying or baking of the coated component body 4 subsequent to the dipping into the coating solution, thereby tending to leave a gap between the coating 15 and the surface of each of the lead wires 5 and 6, the film must have a minimal thickness so as to avoid any possible adverse effect the gap may bring on the complete ceramic capacitor.

Since the complete ceramic capacitor manufactured according to the method of the present invention is substantially free from the buldges of coating material such as formed in the prior art ceramic capacitor, it can readily be mounted on the printed circuit board without being inclined relative to the printed circuit board. In addition, soldering can readily be performed to electrically connect the lead wires to the printed circuit wirings without any possible intrusion of a soldering flux into the inside of the outer protective coating. Moreover, even though the lead wires are bent inwardly or outwardly with respect to each other during the mounting of the capacitor on the printed circuit board in readiness for the soldering, there is no possibility of the outer protective coating being damaged.

Although the present invention has fully been described in connection with the preferred embodiment thereof with reference to the accompanying drawings, it is to be noted that various changes and modifications are apparent to those skilled in the art. Such changes and modifications are to be understood as included within the true scope of the present invention unless they depart therefrom.

We claim:

1. A method of forming an outer protective coating on an electric component of a type including a component body and at least one pair of lead wires extending outwardly therefrom in generally the same direction, said method comprising the steps of:
   first dipping the electric component into a solution of chlorinated hydrocarbon having dissolved therein a solute selected from the group consisting of aliphatic hydrocarbon and higher fatty acid, said dipping being carried out with the component body and only those portions of the lead wires adjacent the component body being immersed into the solution to form a film of the solute covering both the entire surface of the component body and the surfaces of those portions of the lead wires adjacent said component body;
   then dipping the electric component into a solvent with the component body partially immersed into the solvent to remove the film covering all surfaces of the component body except for those surfaces of the component body located adjacent the lead wires; and thereafter
   dipping the electric component into an insulative coating solution with both the component body and those portions of the lead wires adjacent said component body being immersed into the insulative coating solution to form an outer protective coating enclosing the component body therein.

2. A method as claimed in claim 1, further comprising the step of heat-treating the electric component to evaporate the solvent subsequent to the second mentioned dipping step.

3. A method as claimed in claim 1, wherein the depth through which the electric component is immersed in the solution during the first mentioned dipping step is within the range of 3 to 5 mm. as measured from the surface level of the solution to a portion of the perimeter of the component body nearest to the surface level of the solution.

4. A method as claimed in claim 1, wherein the depth through which the electric component is immersed in the solvent during the second mentioned dipping step is within the range of $\frac{2}{3}$ to 4/5 of the distance between the opposed peripheral portions of the component body as measured in a direction perpendicular to the surface level of the solvent within a bath.

5. A method as claimed in claim 1, wherein the depth through which the electric component is immersed in the coating solution during the last mentioned dipping step is within the range of 1 to 3 mm. as measured from the surface level of the solution to a portion of the perimeter of the component body nearest to the surface level of the coating solution.

6. A method as claimed in claim 5, wherein the withdrawal of the coated electric component from the coating solution is carried out at a rate of 2 mm/sec.

7. A method as claimed in claim 1, 2, 3, 4, 5 or 6, wherein the amount of the solute dissolved in the solution used during the first mentioned dipping step is within the range of 1 to 5 wt%.

8. A method as claimed in claim 1, wherein said solute film is repellant to said insulative coating solution.

* * * * *